(12) United States Patent
Young et al.

(10) Patent No.: US 11,140,040 B2
(45) Date of Patent: Oct. 5, 2021

(54) SYSTEMS AND METHODS FOR DESIGNING A SLICE INFRASTRUCTURE

(71) Applicant: Verizon Patent and Licensing Inc., Arlington, VA (US)

(72) Inventors: Kristen Sydney Young, Morris Plains, NJ (US); Hans Raj Nahata, New Providence, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/789,657

(22) Filed: Feb. 13, 2020

(65) Prior Publication Data
US 2021/0258221 A1 Aug. 19, 2021

(51) Int. Cl.
*H04L 12/24* (2006.01)
*G06N 20/00* (2019.01)

(52) U.S. Cl.
CPC ......... *H04L 41/0893* (2013.01); *G06N 20/00* (2019.01); *H04L 41/082* (2013.01); *H04L 41/12* (2013.01); *H04L 41/16* (2013.01)

(58) Field of Classification Search
CPC ... H04L 41/0893; H04L 41/082; H04L 41/12; H04L 41/16; G06N 20/00
USPC ....................................................... 709/223
See application file for complete search history.

(56) References Cited

U.S. PATENT DOCUMENTS

| 10,880,185 | B1* | 12/2020 | Hermoni | H04L 43/062 |
| 2016/0353367 | A1* | 12/2016 | Vrzic | H04W 72/0433 |
| 2018/0077024 | A1* | 3/2018 | Zhang | H04L 41/50 |
| 2018/0132138 | A1* | 5/2018 | Senarath | H04L 41/5041 |

FOREIGN PATENT DOCUMENTS

CN 110213780 A * 9/2019

* cited by examiner

*Primary Examiner* — Umar Cheema
*Assistant Examiner* — John Fan

(57) ABSTRACT

A device associated with a network may receive a service profile for a network slice of the network, where the service profile includes one or more service characterizations of the network slice. The device may determine, based on thresholding rules and for each service characterization, whether the service characterization requires selection from a plurality of building blocks, to obtain a group of service characterizations requiring selection. The device may select, based on selection rules and for each service characterization of the group of service characterizations requiring selection, a building block from the plurality of building blocks, to obtain selected building blocks, where the selection rules map attributes of service characterizations to building blocks. The device may stack, based on stacking rules, the selected building blocks, to obtain a slice infrastructure for the network slice. The device may deploy the slice infrastructure for the network slice in the network.

20 Claims, 7 Drawing Sheets

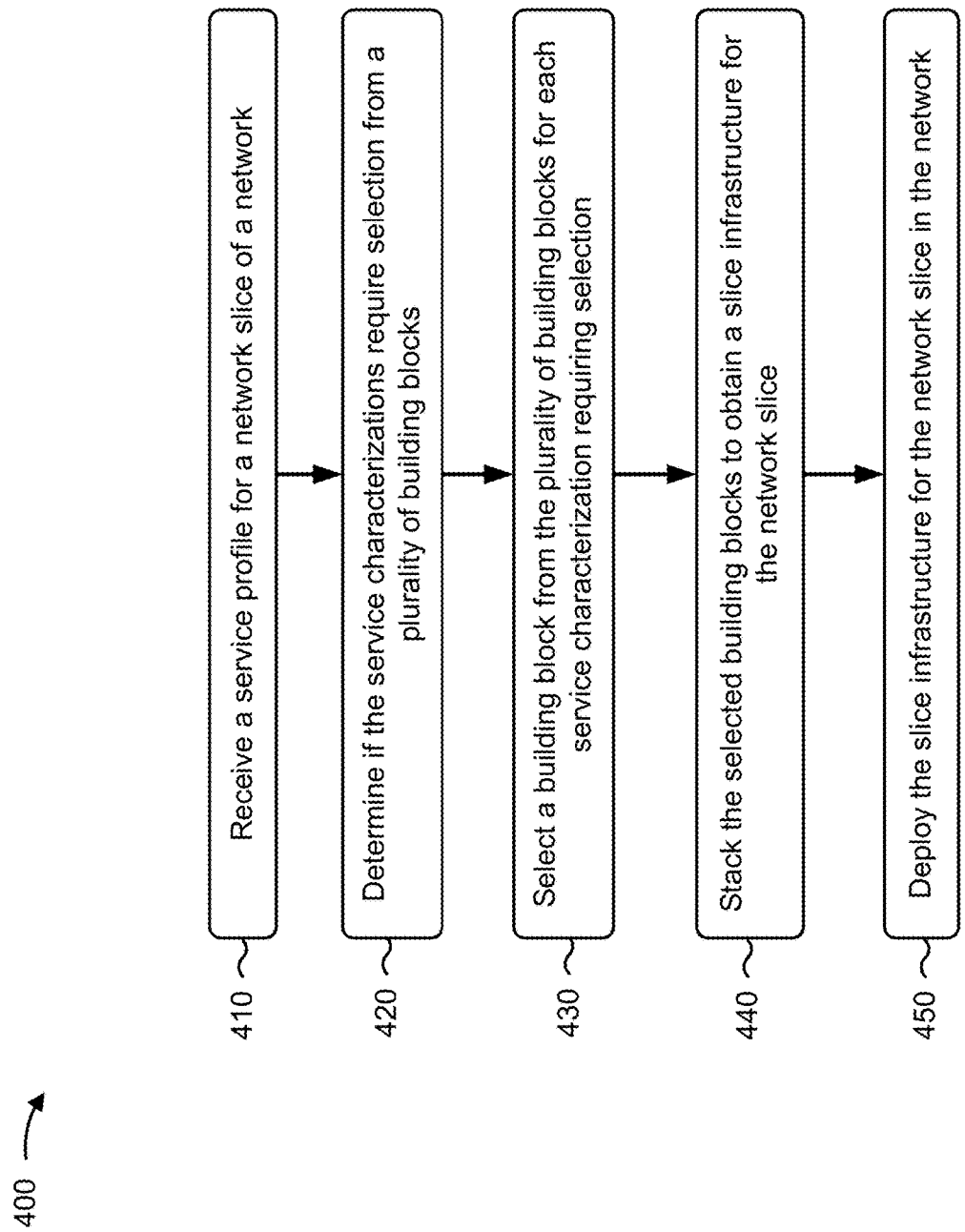

SYSTEMS AND METHODS FOR DESIGNING A SLICE INFRASTRUCTURE

BACKGROUND

Fifth generation (5G)/New Radio (NR) 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIG. 4 is a flow chart of an example process for designing and deploying a stackable slice infrastructure in a network.

DETAILED DESCRIPTION OF PREFERRED EMBODIMENTS

Figure 1A:
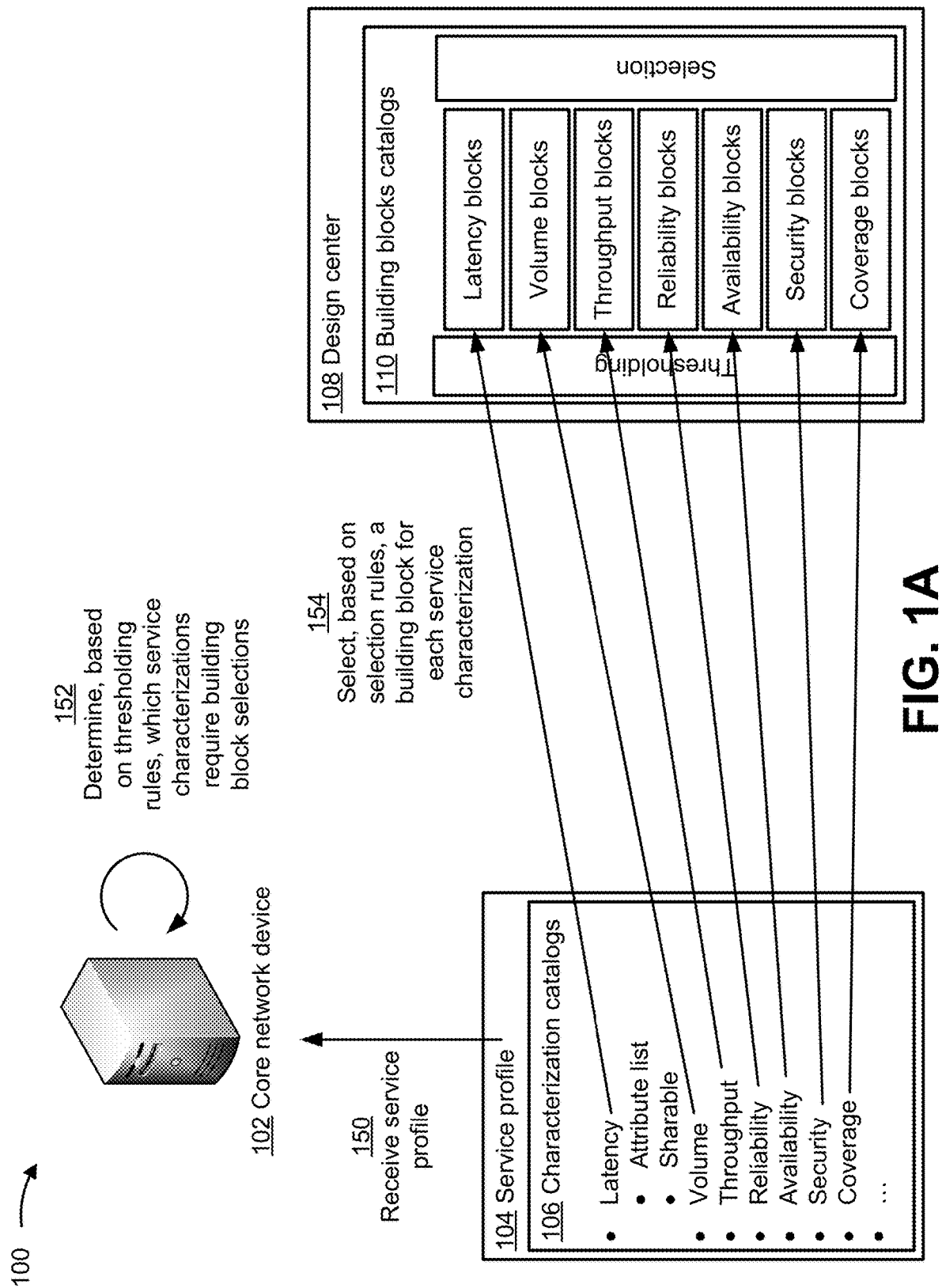
FIGS. 1A-1D are diagrams of one or more example implementations described herein.

The following detailed description of example implementations refers to the accompanying drawings. The same reference numbers in different drawings may identify the same or similar elements.

A 5G network may allow deployment of a distributed core network and a disaggregated radio access network (RAN) architecture to support diverse use cases with different service level agreements (SLAs). Support for these diverse use cases may be achieved through network slices (e.g., logical network instances customized to support the SLAs), which may allow for multiple virtual networks to run on a single physical network to support multiple services, applications, and/or entities (e.g., end users, customers, organizations that provide a service to end users of the wireless telecommunications systems, and/or the like).

In general, a network slice may refer to a logical end-to-end network that may be dynamically created to serve a particular service type with an agreed-upon service level (e.g., in an SLA), where a single user equipment (UE) may access or otherwise connect in parallel to multiple network slices over a single radio interface (or air interface). Each network slice may be configured to give a distinct customer experience (e.g., ultra-reliable (UR) services, ultra-high bandwidth (UHB), extremely low-latency, ultra-reliable low-latency communication (URLLC), and/or the like). For example, in a given scenario, a UE may be associated with a first network slice for Internet browsing, a second network slice for an augmented reality (AR) and/or virtual reality (VR) game, a third network slice for vehicle-to-everything (V2X) communication, and/or the like. However, manually designing, constructing, and creating thousands, millions, billions, and/or the like of network slices in infrastructure of the physical network to support varied services, applications, and/or entities that may change dynamically would be a huge task. Furthermore, the large quantity of information associated with the thousands, millions, billions, and/or the like of network slices cannot be manually processed.

Some implementations described herein provide systems and methods for designing a stackable slice infrastructure that may be machine executable, automated, and/or the like. For example, a device associated with a network may receive a service profile for a network slice of the network, where the service profile includes service characterizations of the network slice. In some implementations, the device may select, based on selection rules, a building block for each service characterization, and may stack, based on stacking rules, the building blocks to obtain a slice infrastructure for the network slice. By using the selection rules, the building blocks, and the stacking rules, the device may design the slice infrastructure in an automated manner to support new network slices in the network.

In some implementations, the device may determine, based on thresholding rules, whether each service characterization requires selection of a building block, and may only select building blocks for the service characterizations that require selection of a building block. By using the thresholding rules, the device may reduce the number of building blocks that need to be selected, which conserves computing resources (e.g., processing resources, memory resources, power resources, communication resources, and/or the like) and/or network resources that would otherwise be consumed by selecting a building block for every service characterization.

In some implementations, the device may update, using a machine learning model, the thresholding rules, the selection rules, and/or the stacking rules, to improve efficiency of the implementations when designing infrastructures, improve network performance, and/or the like. For example, the device may update the selection rules, and/or the stacking rules based on historical data associated with network performance, based on changes to deployed infrastructure in the network, and/or the like to improve the efficiency of the implementations when designing infrastructures, improve network performance, and/or the like. In some implementations, the device may update the selection rules, and/or the stacking rules periodically, in response to an instruction (e.g., from another device), in response to detecting a change in the network, and/or the like.

FIGS. 1A-1D are diagrams of one or more example implementations 100 described herein. For example, as shown in FIGS. 1A-1D, example implementation(s) 100 may include a core network device 102, a service profile 104, characterization catalogs 106, a design center 108, building blocks catalogs 110, a block stacking center 112, a slice infrastructure 114, a service orchestration center 116, a deployed infrastructure 118, a modified slice infrastructure 120, a network 122, and examples 1, 2, and 3 of stackable slice infrastructures.

In some implementations, the core network device 102 may be associated with the network 122, which may include a core network and one or more RANs. For example, the RANs of the network 122 may communicate with a data network via the core network, and the core network device 102 may be implemented by one or more devices associated with the core network and may provide various functional elements.

As shown in FIG. 1A, and by reference number 150, the core network device 102 may receive the service profile 104, which includes the characterization catalogs 106. In some implementations, the service profile 104 may include service characterizations of a network slice to be deployed in the network 122. For example, the service profile 104 may include a service characterization of the network slice from one or more of the characterization catalogs 106.

In some implementations, the service characterizations may be grouped into the characterization catalogs 106. For example, and as shown in FIG. 1A, the characterization catalogs 106 may include a latency characterization catalog, a volume characterization catalog, a throughput characterization catalog, a reliability characterization catalog, an availability characterization catalog, a security characterization catalog, a coverage catalog, and/or the like. Thus, the service profile 104 may include, for the network slice, a latency characterization (e.g., relaxed latency communication, low latency communication (LLC), ultra-LLC (U-LLC), and/or the like), a volume characterization (e.g., high volume (HV), ultra HV (U-HV), and/or the like), a throughput characterization (e.g., high throughput, low throughput, and/or the like), a reliability characterization (e.g., a percentage of reliability (e.g., 80 percent, 90 percent, and/or the like), ultra-reliable (UR), and/or the like), an availability characterization (e.g., time periods during which the network slice is available, high redundancy, and/or the like), a security characterization (e.g., basic security, high security, and/or the like), a coverage characterization (e.g., indoor coverage, outdoor coverage, and/or the like), and/or the like.

In some implementations, and as shown in FIG. 1A with respect to the latency characterization catalog, each service characterization of the service profile 104 may include an attribute list and, for each attribute of the attribute list, an indication of whether the network slice can share the attribute with another network slice. For example, the service profile 104 may include an attribute of U-LLC for the latency characterization and an indication that the U-LLC may be shared with another network slice, such that the network slice and the other network slice may, for example, share infrastructure (e.g., physical network infrastructure, network function infrastructure, and/or the like) enabling and/or providing U-LLC service.

As shown in FIG. 1A, and by reference number 152, the core network device 102 may determine, based on thresholding rules, which service characterizations require building block selections. In some implementations, the core network device 102 may determine, based on one or more thresholding rules and for each service characterization in the service profile 104, whether the service characterization requires selection from a plurality of building blocks to obtain a group of service characterizations requiring selection from the plurality of building blocks. For example, the core network device 102 may determine, based on the thresholding rules, that a latency characterization for U-LLC requires selection of a building block.

As another example, the core network device 102 may determine, based on the thresholding rules, that a reliability characterization of about 90 percent reliability does not require selection of a building block (e.g., because the network provides reliability greater than 90 percent and/or the like). Thus, in some implementations, the core network device 102 may compare, based on the thresholding rules, service characterizations to conditions of the network, to determine whether each of the service characterizations requires selection of a building block. By using the thresholding rules to obtain the group of service characterizations requiring selection from the plurality of building blocks, the device may reduce the number of building blocks that need to be selected, which conserves computing resources (e.g., processing resources, memory resources, power resources, communication resources, and/or the like) and/or network resources that would otherwise be consumed by selecting a building block for every service characterization.

As shown in FIG. 1A, and by reference number 154, the core network device 102 may select, based on selection rules, a building block for each service characterization. In some implementations, the core network device 102 may select, based on one or more selection rules, and for each service characterization of the group of service characterizations requiring selection from the plurality of building blocks, a building block from the plurality of building blocks.

In some implementations, and as shown in FIG. 1A, the building blocks may be grouped into building block catalogs 110, and each building block catalog may correspond to a characterization catalog in the characterization catalogs 106. In some implementations, the core network device 102 may group the building blocks into the building block catalogs 110 in the design center 108, and may use an open network automation platform (ONAP) framework to implement the design center 108. For example, a latency building block catalog may correspond to a latency characterization catalog. In such implementations, the core network device 102 may select, based on the selection rules, for each service characterization of the group of service characterizations requiring selection from the plurality of building blocks, and from a block catalog corresponding to a characterization catalog into which a given service characterization is grouped, a building block from the plurality of building blocks. For example, the core network device 102 may select, based on the selection rules and for a latency characterization in the latency characterization catalog, a latency building block from the latency building blocks catalog.

In some implementations, each building block catalog may be a mandatory building block catalog or an optional building block catalog, where the core network device 102 may be required to select a building block from each mandatory building block catalog and may not be required to select a building block from each optional building block catalog. For example, a latency building block catalog, a volume building block catalog, and/or the like may be a mandatory building block catalog, and a security building block catalog may be an optional building block catalog. In some implementations, building blocks in mandatory building block catalogs may be base building blocks as described herein with respect to FIG. 1B.

In some implementations, the core network device 102 may determine, based on the thresholding rules, that service characterizations in characterization catalogs corresponding to mandatory building block catalogs require building block selections. In some implementations, the core network device 102 may determine, based on the thresholding rules, that service characterizations in characterization catalogs corresponding to optional building block catalogs may or may not require building block selections (e.g., due to network conditions, due to network performance, and/or the like).

In some implementations, a building block catalog may define network functions and network resources. For example, a building block catalog for latency may define network functions and network resources for providing network service of various latencies. In some implementations, a building block catalog may define configurations of network functions and network resources of other building blocks. For example, a building block catalog for reliability may define configurations of network functions and network resources of other building blocks (e.g., a building block in the building block catalog for latency, a building block in the building block catalog for volume, and/or the like).

In some implementations, the selection rules may map attributes of service characterizations to building blocks. For example, the selection rules may map an attribute of UR for the reliability characterization to a UR building block. In some implementations, the building blocks may represent infrastructure and/or service modes that are designed and/or verified to provide one or more attributes of service characterizations. For example, a UR building block may represent a service mode (e.g., a set of configurations and/or the like) capable of providing UR service. As another example, a U-LLC building block may represent an infrastructure (e.g., one or more devices in a RAN, the core network, and/or the data network) capable of providing U-LLC service. In this way, the selection rules may map attributes of service characterizations to building blocks corresponding to infrastructure and/or service modes that are designed and/or verified to provide the attributes of the service characterizations.

In some implementations, the core network device 102 may use an open network automation platform (ONAP) framework to implement the design center 108, and as shown in FIG. 1A, the design center 108 may include the building blocks catalogs 110, the building blocks, the thresholding rules, and the selection rules. For example, the core network device 102 may define, using a service design and creation (SDC) function, each building block. In some implementations, the core network device 102 may implement the design center 108 using an ONAP optimization function (OOF). In some implementations, the core network device 102 may define a workflow for the OOF to produce building blocks using a Topology and Orchestration Specification for Cloud Applications (TOSCA) parser.

Figure 1B:
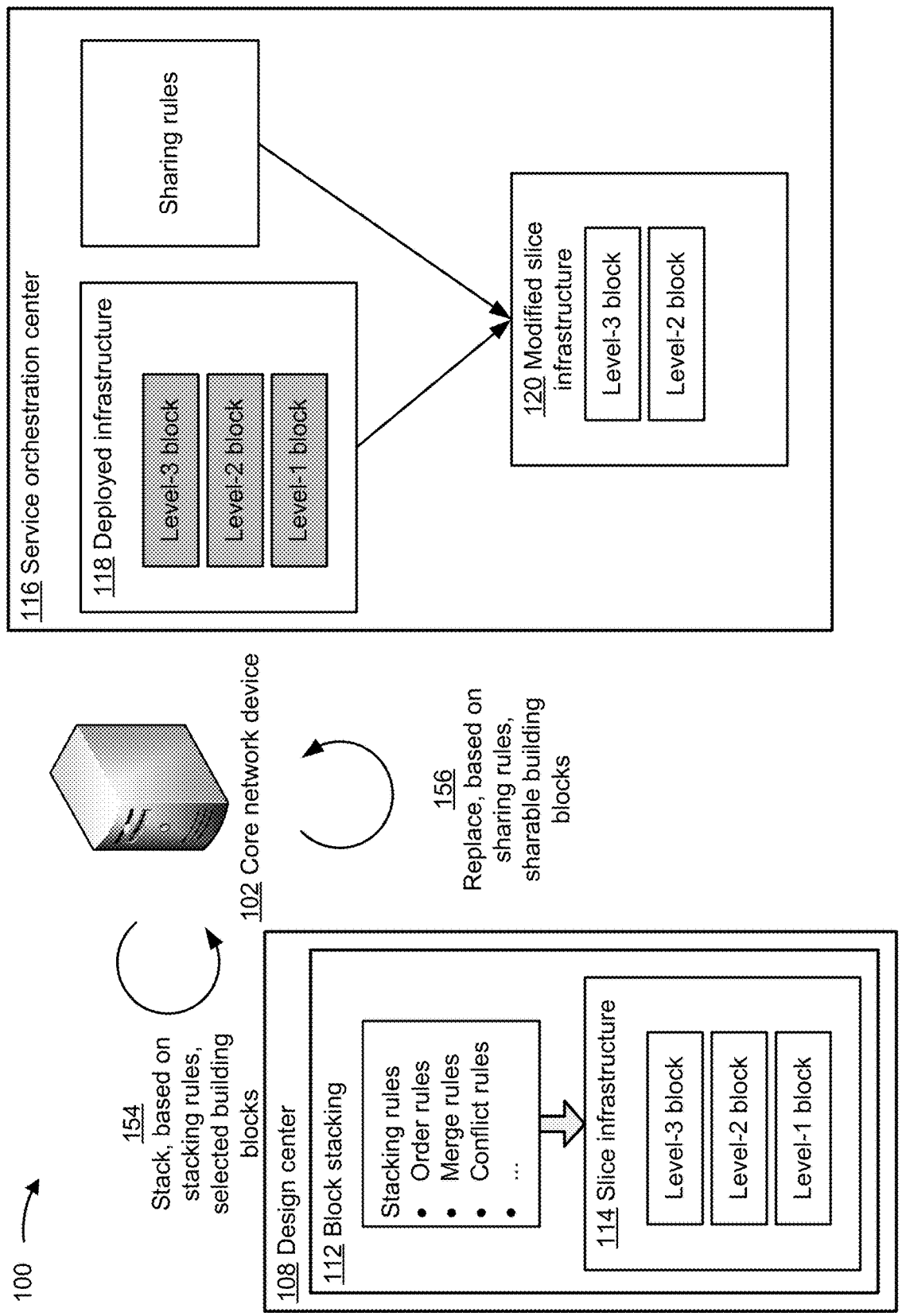

As shown in FIG. 1B, and by reference number 154, the core network device 102 may stack, based on stacking rules, selected building blocks. In some implementations, the core network device 102 may stack, based on one or more stacking rules, the selected building blocks to obtain the slice infrastructure 114 for the network slice.

As shown in FIG. 1B, the stacking rules may include order rules. In some implementations, the order rules may define an order for stacking the selected building blocks. For example, the order rules may require that a base building block be instantiated before another building block may be instantiated. In some implementations, a base building block may be a building block that does not require another building block to be instantiated before the base building block is instantiated. Additionally, or alternatively, a building block that is not a base building block may be a building block for a service that requires a building block for another service to be instantiated before the non-base building block is instantiated. For example, a building block for a service instantiated at a central unit (CU) level of a RAN may not be a base building block because another building block instantiated at a distributed unit (DU) level of the RAN, where the DU level is lower than the CU level, must be instantiated before the building block for the service can be instantiated at the CU level. As another example, as shown in FIG. 1D, and by Example 1, an enhanced mobile broadband (eMBB) building block may be a base building block, and the UR building block may not be a base building block because the eMBB building block is an infrastructure building block and the UR building block is a mode building block that requires instantiation of infrastructure before being instantiated.

As also shown in FIG. 1B, the stacking rules may include merge rules. In some implementations, the merge rules may determine whether two or more building blocks of the selected building blocks may be merged. In some implementations, the merge rules may determine that latency building blocks and volume building blocks may be merged. For example, as shown in FIG. 1D, and by Example 2, the merge rules may determine that an LLC building block and an HV building block may be merged to form an LLC and HV building block. As another example, as shown in FIG. 1D, and by Example 3, the merge rules may determine that a U-LLC building block and a U-HV building block may be merged to form a U-LLC and U-HV building block.

As also shown in FIG. 1B, the stacking rules may include conflict rules. In some implementations, the conflict rules may determine how to resolve two or more conflicting attributes of the selected building blocks. For example, a first building block may have an LLC attribute and a U-HV attribute, a second building block may have a U-LLC attribute and an HV attribute, and the service profile 104, of the network slice, may include a U-LLC attribute and a U-HV attribute. In such an example, the conflict rules may determine to resolve conflicting latency attributes and conflicting volume attributes based on the service profile, by not enabling the LLC attribute of the first building block, enabling the U-HV attribute of the first building block, enabling the U-LLC attribute of the second building block, and not enabling the HV attribute of the second building block.

As shown in FIG. 1B, the slice infrastructure 114 for the network slice may include different levels of building blocks (e.g., a Level-1 block, a Level-2 block, a Level-3 block, and/or the like). In some implementations, Level-1 blocks may correspond to base building blocks, building blocks from one or more mandatory building block catalogs (e.g., the latency building block catalog, the volume building block catalog, and/or the like), and/or the like. In some implementations, Level-2 blocks and/or Level-3 blocks may correspond to non-base building blocks, building blocks from one or more optical building block catalogs (e.g., reliability, security, and/or the like), and/or the like. Although the slice infrastructure 114 in FIG. 1B includes three levels of building blocks, in some implementations, the slice infrastructure 114 may include less than three levels of building blocks (e.g., one or two levels) or more than three levels of building blocks (e.g., four levels, five levels, six levels, and/or the like). In some implementations, the slice infrastructure 114 may include a minimum number of building blocks and/or levels of building blocks to satisfy the service characterizations in the service profile 104 of the network slice.

As shown in FIG. 1B, and by reference number 156, the core network device 102 may replace, based on sharing rules, sharable building blocks. In some implementations, the core network device 102 may replace, based on sharing rules, a sharable building block of the slice infrastructure 114 with an instantiated infrastructure (e.g., the deployed infrastructure 118) of another network slice in the network, to obtain the modified slice infrastructure 120. For example, if the Level-1 block of the slice infrastructure 114 corresponds to the Level-1 block of the deployed infrastructure 118, the service profile 104 includes an indication that an attribute corresponding to the Level-1 block of the slice infrastructure 114 may be shared with another network slice, and the Level-1 block of the deployed infrastructure 118 may be shared with another network slice (e.g., based on an indication in another service profile on which the deployed infrastructure 118 is based), the core network device 102 may replace, based on sharing rules, the Level-1 block of the slice infrastructure 114 with the Level-1 block of the deployed infrastructure 118.

In some implementations, the core network device 102, when replacing sharable building blocks, may remove a sharable building block from the slice infrastructure 114 to obtain the modified slice infrastructure 120. For example, and as shown in FIG. 1B, the core network device 102 may remove the Level-1 block from the slice infrastructure 114 to obtain the modified slice infrastructure 120 because the Level-1 block of the deployed infrastructure 118, which is instantiated, may replace the Level-1 block from the slice infrastructure 114. In this way, the core network device 102 may design, based on the sharing rules, slice infrastructures such that an attribute of a building block may be shared by multiple network slices.

In some implementations, the core network device 102 may or may not replace sharable building blocks based on sharing rules and available network resources in the instantiated infrastructure (e.g., the deployed infrastructure 118). For example, and using the example above, if the Level-1 block of the deployed infrastructure 118 does not have enough network resources and/or capacity available to support the network slice (e.g., the slice infrastructure 114) the core network device 102 may not remove the Level-1 block from the slice infrastructure 114.

In some implementations, the core network device 102 may use the ONAP framework to implement the service orchestration center 116, which, as shown in FIG. 1B, may include information regarding the deployed infrastructure 118, the sharing rules, and the modified slice infrastructure 120. For example, the core network device 102 may replace sharable building blocks using the service orchestration center 116.

Figure 1C:
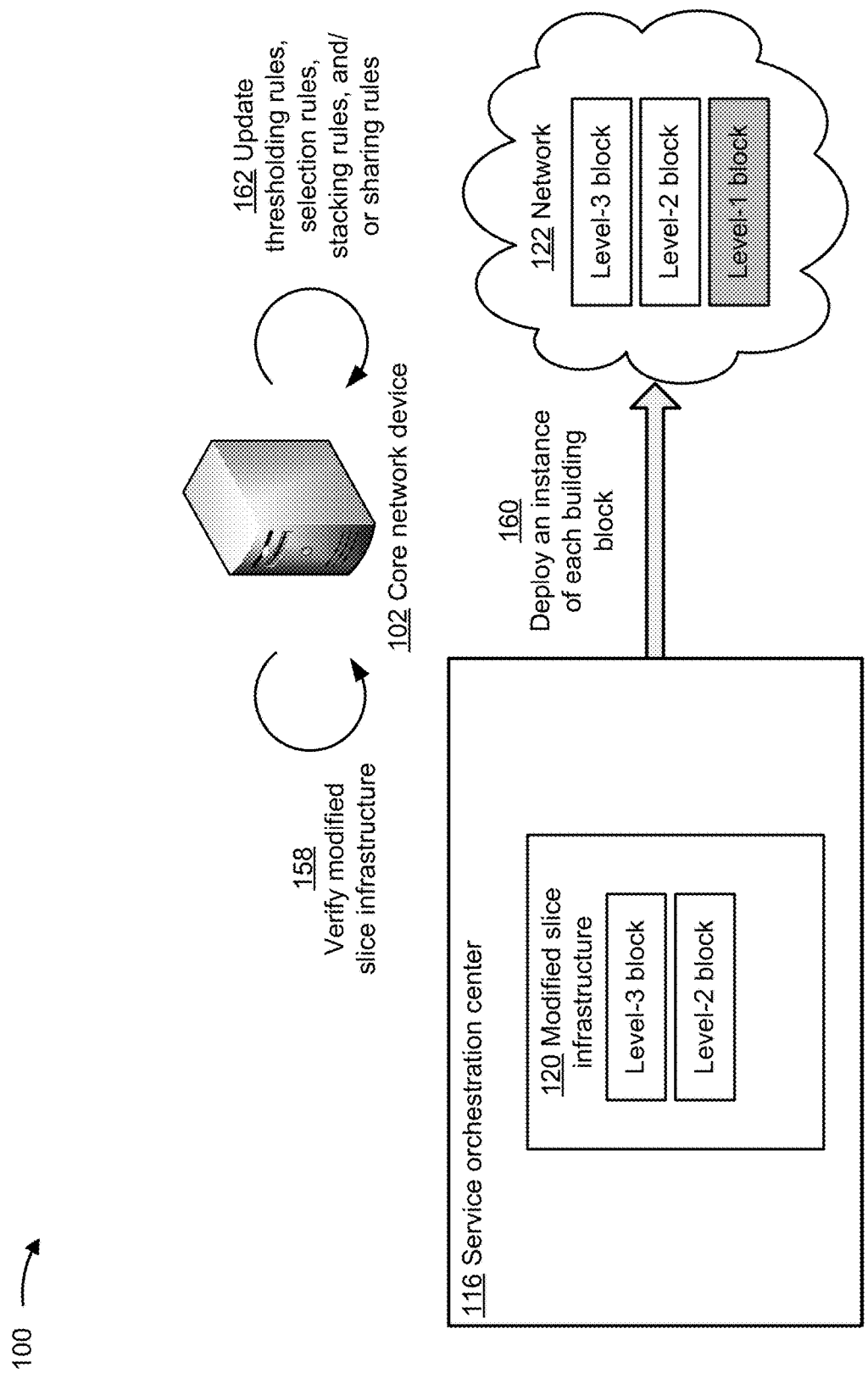
Figure 1D:
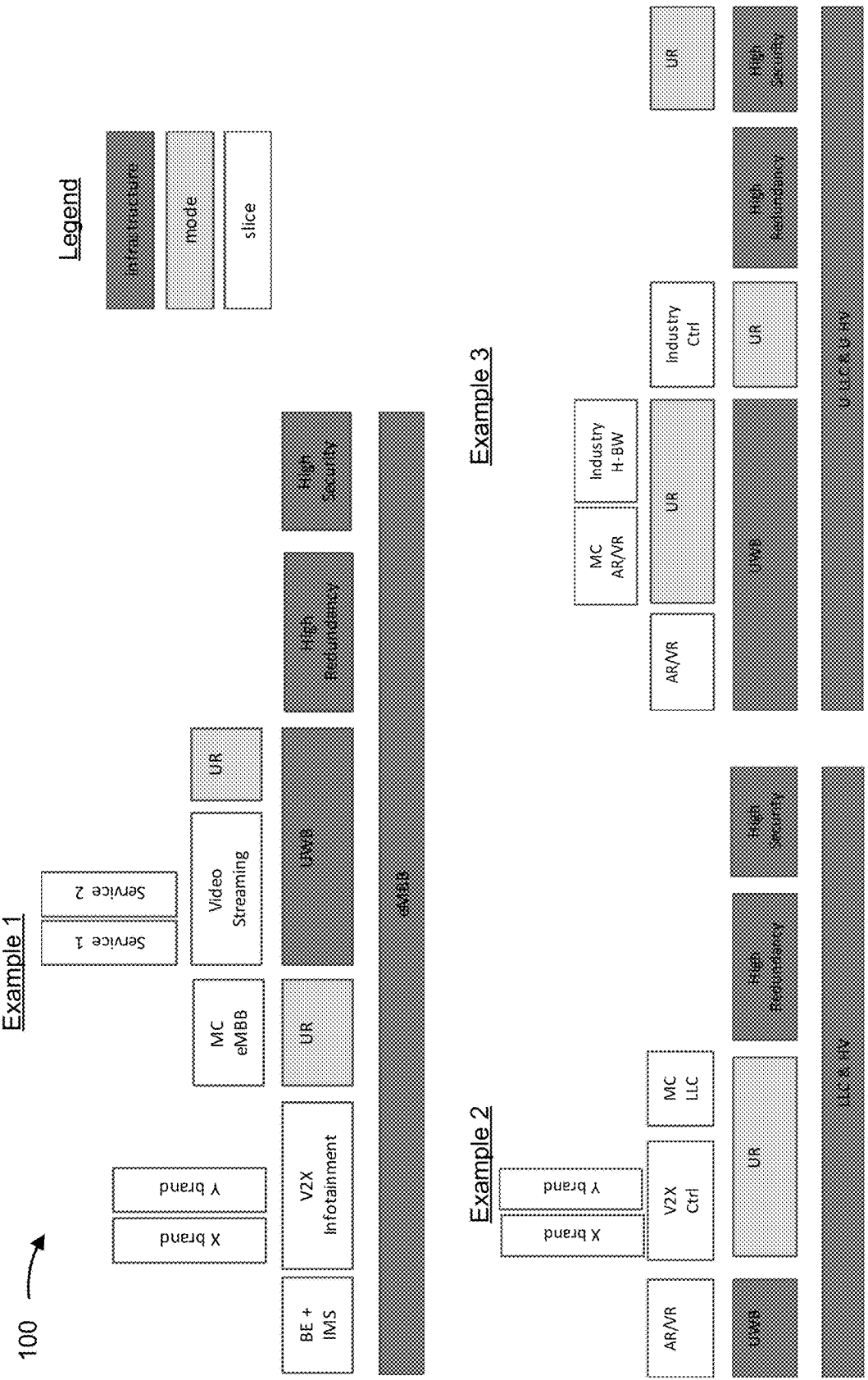

As shown in FIG. 1C, and by reference number 158, the core network device 102 may verify the modified slice infrastructure 120. In some implementations, the core network device 102 may verify the modified slice infrastructure 120 against the service profile 104 for the network slice, a service level agreement (SLA) for the network slice, network resources, network constraints, and/or the like. For example, the core network device 102 may verify that the modified slice infrastructure 120 provides network functions required by the SLA for the network slice, includes building blocks having attributes corresponding to each of the service characterizations in the service profile 104, and/or the like.

As shown in FIG. 1C, and by reference number 160, the core network device 102 may deploy an instance of each building block. In some implementations, the core network device 102 may deploy an instance of each building block in the modified slice infrastructure in the network 122. For example, and as shown in FIG. 1C, the core network device 102 may deploy an instance of the Level-2 block of the modified slice infrastructure in the network 122 on top of an instance of the Level-1 block of the deployed infrastructure 118. The core network device 102 may then deploy an instance of the Level-3 block of the modified slice infrastructure in the network 122 on top of the instance of the Level-2 block.

In some implementations, the core network device 102 may deploy an instance of each building block, where each instance has block instance attributes corresponding to attributes of a building block. For example, the core network device 102 may deploy, for a first building block, an instance of the first building block, where the instance of the first building block has block instance attributes corresponding to block attributes of the first building block. As another example, the core network device 102 may deploy, for a U-LLC building block, an instance of the U-LLC building block having U-LLC block instance attributes. In some implementations, the core network device 102 may deploy, for each building block, an instance of a given building block, where the instance of the given building block has block instance attributes corresponding to block attributes of the given building block.

In some implementations, if the core network device 102 deploys an instance of a building block, the instance of the building block may have block instance attributes that correspond to attributes of the building block and extend the attributes of the building block. For example, if the core network device 102 deploys an instance of a UR building block on top of an instance of a U-LLC and U-HV building block, the U-LLC and U-HV block instance attributes may extend the U-LLC and U-HV attributes of the U-LLC and U-HV building block to the UR building block.

In this way, the core network device 102 may instantiate the network slice in the network 122 by deploying instances of the building blocks in relationship with other infrastructure already instantiated in the network 122. Furthermore, by using building blocks representing infrastructure and/or service modes that are designed and/or verified to provide one or more attributes of service characterizations, the core network device 102 may design, based on attributes in a service profile, a slice infrastructure for network slices in an automated manner to support new network slices in the network.

As shown in FIG. 1C, and by reference number 162, the core network device 102 may update the thresholding rules, the selection rules, the stacking rules, and/or the sharing rules. In some implementations, the core network device 102 may update, using a machine learning model, the selection rules, the stacking rules, and/or the sharing rules to improve efficiency of designing slice infrastructures for network slices, improve network performance, and/or the like.

For example, the core network device 102 may train the machine learning model using a set of observations. The set of observations may be obtained and/or input from historical data, such as data gathered during one or more processes described herein. For example, the set of observations may include data gathered from designing slice infrastructures for network slices and performance data (e.g., computing and/or network resources used to design slice infrastructures, performance of slice infrastructures deployed in the network, performance of the network, and/or the like), as described elsewhere herein. In some implementations, the machine learning system may receive the set of observations (e.g., as input) from a UE, a RAN, a base station, the core network, and/or the like.

In some implementations, a feature set may be derived from the set of observations. The feature set may include a set of variable types, such as the thresholding rules, the selection rules, the stacking rules, the sharing rules, and/or the like. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from a UE, a RAN, a base station, the core network, and/or the like. For example, the machine learning model may identify a feature set (e.g., one or more features and/or corresponding feature values) from structured data input to the machine learning model, such as by extracting data from a particular column of a table including data regarding slice infrastructure designs, performance data, and/or the like, extracting data from a particular field of a form including data regarding slice infrastructure designs, performance data, and/or the like, extracting data from a particular field of a message regarding data regarding slice infrastructure designs, performance data, and/or the like, extracting data received in a structured data format regarding slice infrastructure designs, performance data, and/or the like, and/or the like. In some implementations, the machine learning model may determine features (e.g., variables types) for a feature set based on input received from a UE, a RAN, a base station, the core network, and/or the like, such as by extracting or generating a name for a column, extracting or generating a name for a field of a form and/or a message, extracting or generating a name based on a structured data format, and/or the like.

Using the set of observations and the feature set as inputs to the machine learning model, the core network device 102 may use the machine learning model to update the thresholding rules, the selection rules, the stacking rules, and/or the sharing rules to conserve computing and/or network resources used to design slice infrastructures, improve performance of slice infrastructures deployed in the network, improve performance of the network, and/or the like.

As shown in FIG. 1D, the core network device 102 may design, using the building blocks, various slice infrastructures to support network slices. As shown in Example 1, an eMBB building block may serve as a base building block. A bandwidth enhanced (BE) and Internet Protocol Multimedia Subsystem (IMS) network slice, a vehicle-to-everything (V2X) infotainment slice, a first UR mode building block, an ultra-wide band (UWB) building block, a high redundancy building block, and a high security building block may be instantiated on top of the eMBB building block and may share one or more attributes of the eMBB building block. In some implementations, the BE and IMS network slice may provide BE and IMS service using the eMBB infrastructure.

An X brand network slice and a Y brand network slice may be instantiated on top of the V2X infotainment network slice and may share one or more attributes of the V2X infotainment network slice. For example, the X brand network slice may provide, to X brand vehicles, V2X infotainment services using the eMBB infrastructure, and the Y brand network slice may provide, to Y brand vehicles, V2X infotainment services using the eMBB infrastructure.

A mission critical (MC) eMBB network slice may be instantiated on top of the first UR mode building block. For example, the MC eMBB network slice may provide mission critical services in the first UR mode using the eMBB infrastructure.

A video streaming network slice and a second UR mode building block may be instantiated on top of the UWB building block and may share one or more attributes of the UWB building block. For example, the video streaming network slice may provide UWB video streaming service using the UWB infrastructure and the eMBB infrastructure, and the second UR mode building block may provide UWB service in the third UR mode using the UWB infrastructure and the eMBB infrastructure.

A service 1 network slice and a service 2 network slice may be instantiated on top of the video streaming network slice. For example, the service 1 network slice may provide UWB video streaming functions to service 1 using the UWB infrastructure and the eMBB infrastructure, and the service 2 network slice may provide UWB video streaming functions to service 2 using the UWB infrastructure and the eMBB infrastructure.

In some implementations, the high redundancy building block may provide high redundancy service using the eMBB infrastructure. In some implementations, the high security building block may provide highly secure service using the eMBB infrastructure.

As shown in Example 2 of FIG. 1D, an LLC and HV building block may serve as a base building block. A UWB building block, a UR mode building block, a high redundancy building block, and a high security building block may be instantiated on top of the LLC and HV building block and may share one or more attributes of the LLC and HV building block.

An augmented reality/virtual reality (AR/VR) network slice may be instantiated on top of the UWB building block. For example, the AR/VR network slice may provide LLC, HV, AR/VR functions using the UWB infrastructure and the LLC and HV infrastructure.

A V2X control (V2X ctrl) network slice and an MC LLC network slice may be instantiated on top of the UR mode building block and may share one or more attributes of the UR mode building block. For example, the V2X ctrl network slice may provide LLC and HV service in UR mode using the LLC and HV infrastructure, and the MC LLC network slice may provide mission critical LLC service in the UR mode using the LLC and HV infrastructure.

In some implementations, the high redundancy building block may provide high redundancy service using the LLC and HV infrastructure. In some implementations, the high security building block may provide highly secure service using the LLC and HV infrastructure.

As shown in Example 3 of FIG. 1D, a U-LLC and U-HV building block may serve as a base building block. A UWB building block, a first UR mode building block, a high redundancy building block, and a high security building block may be instantiated on top of the U-LLC and U-HV building block and may share one or more attributes of the U-LLC and U-HV building block.

An AR/VR network slice and a second UR mode building block may be instantiated on top of the UWB building block and may share one or more attributes of the UWB building block. For example, the AR/VR network slice may provide U-LLC, U-HV, AR/VR functions using the UWB infrastructure and the U-LLC and U-HV infrastructure, and the second UR mode building block may provide U-LLC, U-HV, UR mode service using the UWB infrastructure and the U-LLC and U-HV infrastructure.

An MC AR/VR network slice and an industry high bandwidth (H-BW) network slice may be instantiated on top of the second UR mode building block and may share one or more attributes of the second UR mode building block. For example, the MC AR/VR network slice may provide mission critical U-LLC, U-HV, AR/VR functions in the second UR mode using the UWB infrastructure and the U-LLC and U-HV infrastructure, and the industry H-BW network slice may provide, to an industrial entity, H-BW, U-LLC, U-HV service in the second UR mode using the UWB infrastructure and the U-LLC and U-HV infrastructure.

An industry ctrl network slice may be instantiated on top of the first UR mode building block. For example, the industry ctrl network slice may provide U-LLC, U-HV service to industrial control functions in the first UR mode using the U-LLC and U-HV infrastructure. In some implementations, the high redundancy building block may provide high redundancy service using the U-LLC and U-HV infrastructure.

A third UR mode building block may be instantiated on top of the high security building block. For example, the third UR mode building block may provide highly secure service in the third UR mode using the high security infrastructure and the U-LLC and U-HV infrastructure.

As indicated above, FIGS. 1A-1D are provided as examples. Other examples can differ from what is described with regard to FIGS. 1A-1D. The number and arrangement of devices and networks shown in FIGS. 1A-1D are provided as one or more examples. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation(s) 100 may perform one or more functions described as being performed by another set of devices of example implementation(s) 100.

Figure 2:
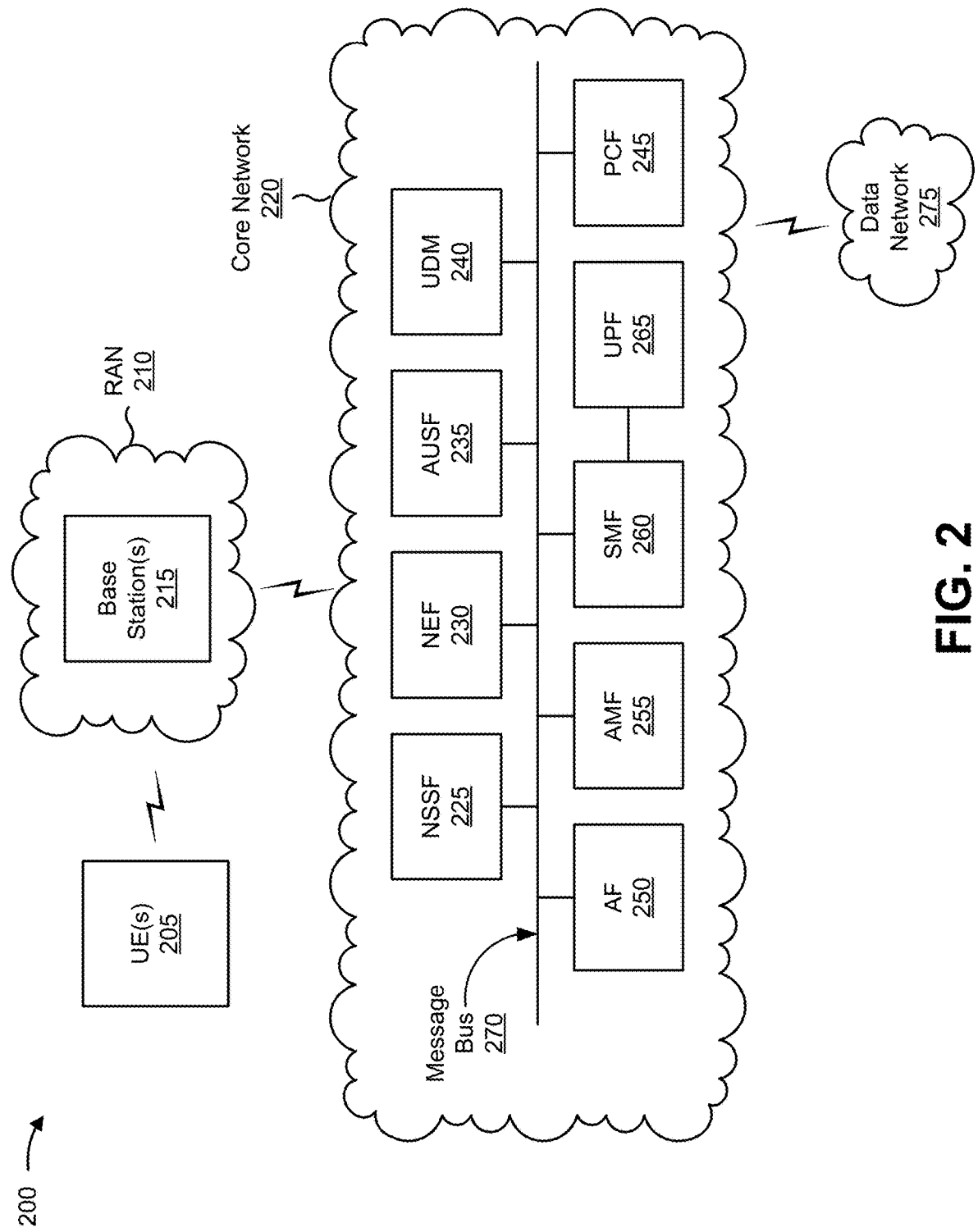
FIG. 2 is a diagram of an example environment in which systems and/or methods described herein may be implemented.

FIG. 2 is a diagram of an example environment 200 in which systems, functional architectures, and/or methods described herein may be implemented. As shown in FIG. 2, environment 200 may include a UE 205, a RAN 210, a base station 215, a core network 220, and a data network 275. As further shown in FIG. 2, core network 220 may include, for example, a Network Slice Selection Function (NSSF) 225, a Network Exposure Function (NEF) 230, an Authentication Server Function (AUSF) 235, a Unified Data Management (UDM) function 240, a Policy Control Function (PCF) 245, an Application Function (AF) 250, an Access and Mobility Management Function (AMF) 255, a Session Management Function (SMF) 260, and a User Plane Function (UPF) 265, which may be communicatively connected via a message bus 270 that may include one or more physical communication channels and/or one or more virtual communication channels. Devices of environment 200 may interconnect via wired connections, wireless connections, or a combination of wired and wireless connections.

UE 205 includes one or more devices capable of communicating with base station 215 and/or a network (e.g., network 122). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 205 may be capable of communicating using uplink (e.g., UE to base station) communications, downlink (e.g., base station to UE) communications, and/or sidelink (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like.

RAN 210 includes a base station and is operatively connected, via a wired and/or wireless connection, to the core network 220 through UPF 265. RAN 210 may facilitate communications sessions between UEs and data network 275 by communicating application-specific data between RAN 210 and core network 220. Data network 275 includes various types of data networks, such as the Internet, a third-party services network, an operator services network, a private network, a wide area network, and/or the like.

Base station 215 includes one or more devices capable of communicating with UE 205 using a cellular Radio Access Technology (RAT). For example, base station 215 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 215 may transfer traffic between UE 205 (e.g., using a cellular RAT), other base stations 215 (e.g., using a wireless interface or a backhaul interface, such as a wired backhaul interface), RAN 210, and/or data network 275. Base station 215 may provide one or more cells that cover geographic areas. Some base stations 215 may be mobile base stations. Some base stations 215 may be capable of communicating using multiple RATs.

In some implementations, base station 215 may perform scheduling and/or resource management for UEs 205 covered by base station 215 (e.g., UEs 205 covered by a cell provided by base station 215). In some implementations, base stations 215 may be controlled or coordinated by a network controller, which may perform load balancing, network-level configuration, and/or the like. The network controller may communicate with base stations 215 via a wireless or wireline backhaul. In some implementations, base station 215 may include a network controller, a self-organizing network (SON) module or component, or a similar module or component. In other words, a base station 215 may perform network control, scheduling, and/or network management functions (e.g., for other base stations 215 and/or for uplink, downlink, and/or sidelink communications of UEs 205 covered by the base station 215).

In some implementations, base station 215 may include a central unit and multiple distributed units. The central unit may coordinate access control and communication with regard to the multiple distributed units. The multiple distributed units may provide UEs 205 and/or other base stations 215 with access to core network 220 or data network 275. For example, in some implementations, the central unit may be a logical node that hosts Radio Resource Control (RRC) and Packet Data Convergence Protocol (PDCP) protocols of base station 215 and optionally further hosts a Service Data Adaptation Protocol (SDAP) protocol of base station 215. The multiple distributed units may be logical nodes that host Radio Link Control (RLC), Medium Access Control (MAC), and Physical (PHY) layers of base station 215. In some implementations, one distributed unit may include one or more radios that are used to support one or multiple cells that may provide UEs 205 and/or other base stations 215 with access to core network 220 or data network 275. Furthermore, in some implementations, the central unit may be disaggregated or otherwise split into control plane and user plane nodes. For example, the control plane node may be a logical node hosting the RRC and the control plane part of the PDCP protocol for the central unit of base station 215 while the user plane node may be a logical node that hosts the user plane part of the PDCP protocol and optionally further hosts the SDAP protocol for the central unit of base station 215. In some implementations, a split of layers and/or protocols among the central unit and the multiple distributed units may be flexible.

Accordingly, as used herein, a node associated with RAN 210 (which may be referred to as a "RAN node") may include base station 215, a distributed unit of base station 215, a central unit of base station 215, a control plane part of the central unit of base station 215, a user plane part of the central unit of base station 215, and/or any suitable combination thereof.

Core network 220 may include various functional elements included in a 5G wireless telecommunications system, which may be implemented by one or more of devices (e.g., a device described below with respect to FIG. 3). While the example functional architecture of core network 220 shown in FIG. 2 may be an example of a service-based architecture, in some implementations, core network 220 may be implemented as a reference-point architecture.

As mentioned above, core network 220 may include various functional elements. The functional elements may include, for example, NSSF 225, NEF 230, AUSF 235, UDM 240, PCF 245, AF 250, AMF 255, SMF 260, and UPF 265. These functional elements may be communicatively connected via a message bus 270, which may include one or more physical communication channels and/or one or more virtual communication channels. Each of the functional elements shown in FIG. 2 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 220 may be operatively connected to a RAN 210, a data network 275, and/or the like, via wired and/or wireless connections with UPF 265.

NSSF 225 may select network slice instances for one or more UEs, such as UE(s) 205, where NSSF 225 may determine a set of network slice policies to be applied at the RAN 210. By providing network slicing, NSSF 225 allows an operator to deploy multiple substantially independent end-to-end networks potentially with the same infrastructure. In some implementations, each network slice may be customized for different services. NEF 230 may support the exposure of capabilities and/or events in the wireless telecommunications system to help other entities in the wireless telecommunications system discover network services and/or utilize network resources efficiently.

AUSF 235 may act as an authentication server and support the process of authenticating UEs in the wireless telecommunications system. UDM 240 may store subscriber data and profiles in the wireless telecommunications system. UDM 240 may be used for fixed access, mobile access, and/or the like, in core network 220. PCF 245 may provide a policy framework that incorporates network slicing, roaming, packet processing, mobility management, and/or the like.

AF 250 may determine whether UEs provide preferences for a set of network slice policies and support application influence on traffic routing, access to NEF 230, policy control, and/or the like. AMF 255 may provide authentication and authorization of UEs. SMF 260 may support the establishment, modification, and release of communications sessions in the wireless telecommunications system. For example, SMF 260 may configure traffic steering policies at UPF 265, enforce UE Internet Protocol (IP) address allocation and policies, and/or the like. AMF 255 and SMF 260 may act as a termination point for Non-Access Stratum (NAS) signaling, mobility management, and/or the like. SMF 260 may act as a termination point for session management related to NAS. RAN 210 may send information (e.g. the information that identifies the UE) to AMF 255 and/or SMF 260 via PCF 245.

UPF 265 may serve as an anchor point for intra/inter Radio Access Technology (RAT) mobility. UPF 265 may apply rules to packets, such as rules pertaining to packet routing, traffic reporting, handling user plane QoS, and/or the like. UPF 265 may determine an attribute of application-specific data that is communicated in a communications session. UPF 265 may receive information (e.g., the information that identifies the communications attribute of the application) from RAN 210 via SMF 260 or an application programming interface (API).

Message bus 270 represents a communication structure for communication among the functional elements. In other words, message bus 270 may permit communication between two or more functional elements. Message bus 270 may be a message bus, Hypertext Transfer Protocol Version 2 (HTTP/2) proxy server, and/or the like.

The number and arrangement of functional elements in core network 220 are provided as one or more examples. In practice, core network 220 may have additional functional elements, fewer functional elements, different functional elements, or differently arranged functional elements than those shown in FIG. 2. Furthermore, two or more functional elements in core network 220 may be implemented within a single device, or a single functional element in core network 220 may be implemented as multiple, distributed devices. Additionally, or alternatively, a set of functional elements (e.g., one or more functional elements) of core network 220 may perform one or more functions described as being performed by another set of functional elements of core network 220.

Data network 275 may include various types of data networks, such as the Internet, a third-party services network, an operator services network, a private network, a wide area network, and/or the like. In some implementations, data network 275 may include one or more application servers configured to support one or more applications associated with a session at the UE(s) 205. Furthermore, in some implementations, data network 275 may include one or more application servers that are deployed at an edge of RAN 210, with such application server(s) co-located with one or more nodes that are associated with RAN 210 (e.g., one or more distributed and/or central units associated with base station 215) and/or one or more nodes associated with core network 220 (e.g., UPF 265) to support sessions that are associated with a low-latency service level agreement (SLA).

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
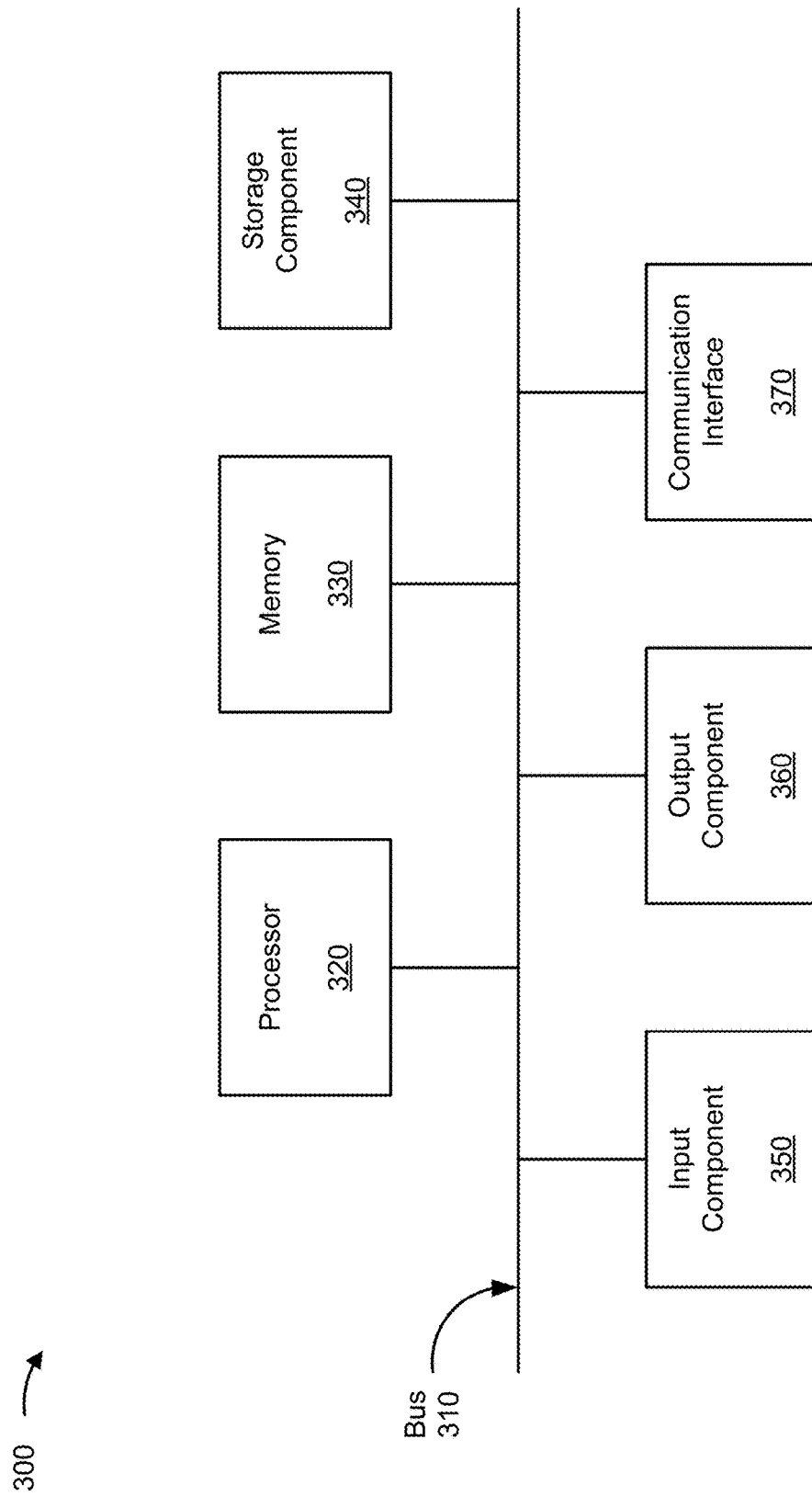
FIG. 3 is a diagram of example components of one or more devices of FIG. 2.

FIG. 3 is a diagram of example components of a device 300. Device 300 may correspond to UE 205, base station 215, a node associated with base station 215 (e.g., a distributed unit of base station 215, a central unit of base station 215, a control plane part of the central unit of base station 215, and/or a user plane part of the central unit of base station 215), NSSF 225, NEF 230, AUSF 235, UDM 240, PCF 245, AF 250, AMF 255, SMF 260, UPF 265, and/or message bus 270. In some implementations, UE 205, base station 215 (or a node associated with base station 215), NSSF 225, NEF 230, AUSF 235, UDM 240, PCF 245, AF 250, AMF 255, SMF 260, UPF 265, and/or message bus 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for designing and deploying a stackable slice infrastructure in a network. In some implementations, one or more process blocks of FIG. 4 may be performed by a core network (e.g., core network 220, core network device 102, and/or the like), such as a core network element (e.g., NSSF 225, NEF 230, AUSF 235, UDM 240, PCF 245, AF 250, AMF 255, SMF 260, UPF 265, and/or the like). In some implementations, one or more process blocks of FIG. 4 may be performed by another device or a group of devices separate from or including the core network, such as a UE (e.g., UE 205), a RAN (e.g., RAN 210), a base station (e.g., base station 215) or one or more nodes associated with a base station (e.g., a distributed unit (DU), a central unit (CU), a central unit control plane (CU-CP) node, a central unit user plane (CU-UP) node, and/or the like), and/or the like. In some implementations, one or more process blocks of FIG. 4 may be performed by the core network using processor 320, memory 330, storage component 340, input component 350, output component 360, communication interface 370, and/or the like.

As shown in FIG. 4, process 400 may include receiving a service profile for a network slice of a network (block 410). For example, the core network may receive a service profile for a network slice of the network, as described above. In some implementations, the service profile includes one or more service characterizations of the network slice. For example, the one or more service characterizations may include at least one of a latency characterization, a volume characterization, a throughput characterization, a reliability characterization, an availability characterization, a security characterization, or a coverage characterization. In some implementations, each of the one or more service characterizations includes one or more attributes and includes, for each attribute of the one or more attributes, an indication of whether the network slice can share the attribute with another network slice.

As further shown in FIG. 4, process 400 may include determining if the service characterizations require selection from a plurality of building blocks (block 420). In some implementations, process 400 may include determining, based on one or more thresholding rules and for each service characterization of the one or more service characterizations, whether the service characterization requires selection from a plurality of building blocks, to obtain a group of service characterizations requiring selection from the plurality of building blocks. For example, the core network may determine, based on one or more thresholding rules and for each service characterization of the one or more service characterizations, whether the service characterization requires selection from a plurality of building blocks, to obtain a group of service characterizations requiring selection from the plurality of building blocks, as described above.

As further shown in FIG. 4, process 400 may include selecting a building block from the plurality of building blocks for each service characterization requiring selection (block 430). In some implementations, process 400 may include selecting, based on one or more selection rules and for each service characterization of the group of service characterizations requiring selection from the plurality of building blocks, a building block from the plurality of building blocks, to obtain selected building blocks. For example, the core network may select, based on one or more selection rules and for each service characterization of the group of service characterizations requiring selection from the plurality of building blocks, a building block from the plurality of building blocks, to obtain selected building blocks, as described above. In some implementations, the one or more selection rules map attributes of service characterizations to building blocks of the plurality of building blocks. In some implementations, selecting the building block from the plurality of building blocks may include selecting, for a given service characterization, the building block from a block catalog, where the block catalog corresponds to a characterization catalog in which the given service characterization is grouped. For example, the one or more service characterizations may be grouped into characterization catalogs, the plurality of building blocks may be grouped into block catalogs, and each block catalog may correspond to a characterization catalog.

As further shown in FIG. 4, process 400 may include stacking the selected building blocks to obtain a slice infrastructure for the network slice (block 440). In some implementations, process 400 may include stacking, based on one or more stacking rules, the selected building blocks, to obtain a slice infrastructure for the network slice. For example, the core network may stack, based on one or more stacking rules, the selected building blocks, to obtain a slice infrastructure for the network slice, as described above. In some implementations, the one or more stacking rules may include at least one of order rules defining an order for stacking the selected building blocks, merge rules for merging two or more building blocks of the selected building blocks, or conflict rules for resolving two or more conflicting attributes of one or more of the selected building blocks.

As further shown in FIG. 4, process 400 may include deploying the slice infrastructure for the network slice in the network (block 450). For example, the core network may deploy the slice infrastructure for the network slice in the network, as described above. In some implementations, deploying the slice infrastructure for the network slice in the network includes deploying, for a first building block of the slice infrastructure, an instance of the first building block, where the instance of the first building block has block instance attributes corresponding to block attributes of the first building block. In some implementations, process 400 may include causing the slice infrastructure for the network slice to be deployed in the network.

In some implementations, deploying the slice infrastructure for the network slice in the network includes replacing, based on sharing rules, a sharable building block of the slice infrastructure with an instantiated infrastructure of another network slice in the network, to obtain a modified slice infrastructure, and deploying the modified slice infrastructure in the network. For example, the sharing rules may determine whether the slice infrastructure and the other network can share attributes.

In some implementations, process 400 may include, before deploying the slice infrastructure and/or the modified slice infrastructure in the network, verifying the slice infrastructure and/or the modified slice infrastructure against at least one of the service profile for the network slice, a service level agreement for the network slice, network resources, or network constraints.

In some implementations, process 400 may include updating, using a machine learning model, at least one of the one or more thresholding rules, the one or more selection rules, or the one or more stacking rules.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device associated with a network, a service profile for a network slice of the network,
      wherein the service profile includes one or more service characterizations of the network slice;
   determining, by the device, based on one or more thresholding rules, and for each service characterization of the one or more service characterizations, whether the service characterization requires selection from a plurality of building blocks, to obtain a group of service characterizations requiring selection from the plurality of building blocks;
   selecting, by the device, based on one or more selection rules, and for each service characterization of the group of service characterizations requiring selection from the plurality of building blocks, a building block from the plurality of building blocks, to obtain selected building blocks,
      wherein the one or more selection rules map attributes of service characterizations to building blocks of the plurality of building blocks;
   stacking, by the device and based on one or more stacking rules, the selected building blocks, to obtain a slice infrastructure for the network slice,
      wherein the one or more stacking rules comprise order rules defining an order for stacking the selected building blocks, and
         the order rules require that a base building block be instantiated before a non-base building block is instantiated;
   replacing, by the device and based on sharing rules, a sharable building block of the slice infrastructure with an instantiated infrastructure of another network slice in the network, to obtain a modified slice infrastructure; and
   deploying, by the device, the modified slice infrastructure for the network slice in the network.

2. The method of claim 1, wherein the one or more service characterizations comprise at least one of a latency characterization, a volume characterization, a throughput characterization, a reliability characterization, an availability characterization, a security characterization, or a coverage characterization.

3. The method of claim 1, wherein each of the one or more service characterizations comprises one or more attributes and comprises, for each attribute of the one or more attributes, an indication of whether the network slice can share the attribute with another network slice.

4. The method of claim 1, wherein the one or more service characterizations are grouped into characterization catalogs,
   wherein the plurality of building blocks are grouped into block catalogs,
   wherein each block catalog of the block catalogs corresponds to a characterization catalog of the characterization catalogs,
   wherein selecting the building block from the plurality of building blocks comprises selecting, by the device and for a given service characterization of the group of service characterizations requiring selection from the plurality of building blocks, the building block from a block catalog of the block catalogs, and
   wherein the block catalog corresponds to a characterization catalog in which the given service characterization is grouped.

5. The method of claim 1, wherein the one or more stacking rules further comprise at least one of:
   merge rules for merging two or more building blocks of the selected building blocks, or
   conflict rules for resolving two or more conflicting attributes of one or more of the selected building blocks.

6. The method of claim 1,
   wherein the sharing rules determine whether the slice infrastructure and the other network can share attributes.

7. The method of claim 1, further comprising:
   updating, by the device and using a machine learning model, at least one of the one or more thresholding rules, the one or more selection rules, or the one or more stacking rules.

8. A device, comprising:
   one or more processors, configured to:
      receive a service profile for a network slice of a network,
         wherein the service profile includes one or more service characterizations of the network slice, and
         wherein the one or more service characterizations are grouped into characterization catalogs;
      determine, based on one or more thresholding rules, and for each service characterization of the one or more service characterizations, whether the service characterization requires selection from a plurality of building blocks, to obtain a group of service characterizations requiring selection from the plurality of building blocks,
         wherein the plurality of building blocks are grouped into block catalogs corresponding to the characterization catalogs, and
         wherein each block catalog of the block catalogs corresponds to a characterization catalog of the characterization catalogs;
      select, based on one or more selection rules, for each service characterization of the group of service characterizations requiring selection from the plurality of building blocks, and from a block catalog corresponding to a characterization catalog into which a given service characterization is grouped, a building block from the plurality of building blocks, to obtain selected building blocks,
         wherein the one or more selection rules map attributes of service characterizations to building blocks of the plurality of building blocks;
      stack, based on one or more stacking rules, the selected building blocks to obtain a slice infrastructure for the network slice,
         wherein the one or more stacking rules comprise order rules defining an order for stacking the selected building blocks, and
            the order rules require that a base building block be instantiated before a non-base building block is instantiated;
      replace, based on sharing rules, a sharable building block of the slice infrastructure with an instantiated infrastructure of another network slice in the network, to obtain a modified slice infrastructure; and
      deploy the modified slice infrastructure for the network slice in the network.

9. The device of claim 8, wherein the one or more service characterizations comprise at least one of a latency characterization, a volume characterization, a throughput characterization, a reliability characterization, an availability characterization, a security characterization, or a coverage characterization.

10. The device of claim 8, wherein each of the one or more service characterizations comprises one or more attributes and comprises, for each attribute of the one or more attributes, an indication of whether the network slice can share the attribute with another network slice.

11. The device of claim 8, wherein the one or more stacking rules further comprise at least one of:
merge rules for merging two or more building blocks of the selected building blocks, or
conflict rules for resolving two or more conflicting attributes of one or more of the selected building blocks.

12. The device of claim 8,
wherein the sharing rules determine whether the slice infrastructure and the other network can share attributes.

13. The device of claim 8, wherein the one or more processors are configured to, when deploying the slice infrastructure for the network slice in the network:
deploy, for a first building block of the modified slice infrastructure, and in the network, an instance of the first building block, wherein the instance of the first building block has block instance attributes corresponding to block attributes of the first building block.

14. The device of claim 8, wherein the one or more processors are further configured to:
before deploying the slice infrastructure for the network slice in the network, verify the slice infrastructure against at least one of the service profile for the network slice, a service level agreement for the network slice, network resources agreement for the network slice, or network constraints agreement for the network slice.

15. The device of claim 8, wherein the one or more processors are further configured to:
update, using a machine learning model, at least one of the one or more thresholding rules, the one or more selection rules, or the one or more stacking rules.

16. A non-transitory computer-readable medium storing instructions, the instructions comprising:
one or more instructions that, when executed by one or more processors, cause the one or more processors to:
receive a service profile for a network slice of a network,
wherein the service profile includes one or more service characterizations of the network slice;
determine, based on one or more thresholding rules, and for each service characterization of the one or more service characterizations, whether the service characterization requires selection from a plurality of building blocks, to obtain a group of service characterizations requiring selection from the plurality of building blocks;
select, based on one or more selection rules, and for each service characterization of the group of service characterizations requiring selection from the plurality of building blocks, a building block from the plurality of building blocks, to obtain selected building blocks,
wherein the one or more selection rules map attributes of service characterizations to building blocks of the plurality of building blocks;
stack, based on one or more stacking rules, the selected building blocks to obtain a slice infrastructure for the network slice,
wherein the one or more stacking rules comprise order rules defining an order for stacking the selected building blocks, and
the order rules require that a base building block be instantiated before a non-base building block is instantiated;
replace, based on sharing rules, a sharable building block of the slice infrastructure with an instantiated infrastructure of another network slice in the network, to obtain a modified slice infrastructure;
verify the modified slice infrastructure against at least one of the service profile for the network slice, a service level agreement for the network slice, network resources, or network constraints; and
deploy, based on verifying the modified slice infrastructure, for each building block of the modified slice infrastructure, and in the network, an instance of a given building block, wherein the instance of the given building block has block instance attributes corresponding to block attributes of the given building block.

17. The non-transitory computer-readable medium of claim 16, wherein the one or more service characterizations comprise at least one of a latency characterization, a volume characterization, a throughput characterization, a reliability characterization, an availability characterization, a security characterization, or a coverage characterization.

18. The non-transitory computer-readable medium of claim 16, wherein each of the one or more service characterizations comprises one or more attributes and comprises, for each attribute of the one or more attributes, an indication of whether the network slice can share the attribute with another network slice.

19. The non-transitory computer-readable medium of claim 16, wherein the one or more stacking rules further comprise at least one of:
merge rules for merging two or more building blocks of the selected building blocks, or
conflict rules for resolving two or more conflicting attributes of one or more of the selected building blocks.

20. The non-transitory computer-readable medium of claim 16, wherein the one or more instructions, when executed by the one or more processors, further cause the one or more processors to:
update, using a machine learning model, at least one of the one or more thresholding rules, the one or more selection rules, or the one or more stacking rules.

* * * * *